No. 868,557. PATENTED OCT. 15, 1907.
R. A. HART.
SUPPORT FOR PUNCHING BAGS.
APPLICATION FILED FEB. 16, 1907.
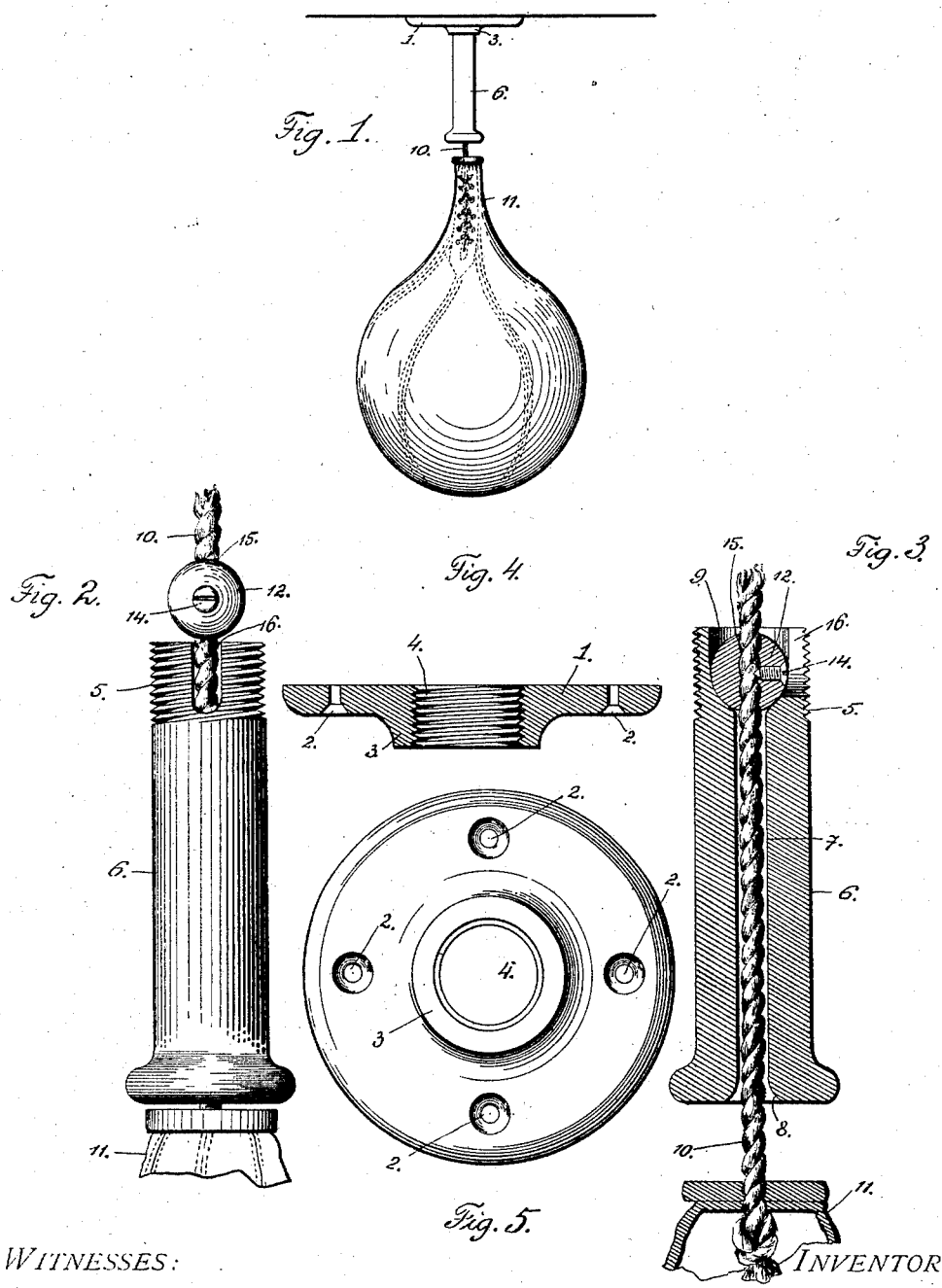
WITNESSES:
INVENTOR
R. A. Hart,
BY
Attorneys

UNITED STATES PATENT OFFICE.

ROBERT A. HART, OF WEST LIBERTY BOROUGH, PENNSYLVANIA.

SUPPORT FOR PUNCHING-BAGS.

No. 868,557.     Specification of Letters Patent.     Patented Oct. 15, 1907.

Application filed February 16, 1907. Serial No. 357,738.

*To all whom it may concern:*

Be it known that I, ROBERT A. HART, a citizen of the United States of America, residing at West Liberty Borough, in the county of Allegheny and State of Pennsylvania, have invented certain new and useful Improvements in Supports for Punching-Bags, of which the following is a specification, reference being had therein to the accompanying drawing.

This invention relates to supports for punching-bags or similar flexible exercising devices, and the invention has for its object to provide a novel swivel for supporting a punching-bag, thereby eliminating or reducing to a minimum friction caused between the movable punching-bag and its permanent support.

Another object of my invention is the provision of positive and reliable means for normally maintaining a punching-bag a predetermined distance from its rebounding device.

A further object of this invention is to overcome the binding of the movable parts of a bag during the movement thereof, thus providing a free and easy movement of the suspension cord or rope of said bag.

With these and other objects in view which will more readily appear as the invention is better understood, the same consists in the novel construction, combination and arrangement of parts to be hereinafter more fully described and then specifically pointed out in the appended claims.

Referring to the drawing forming a part of this specification, like numerals of reference designate corresponding parts throughout the several views, in which:—

Figure 1 is an elevation of my improved punching-bag support, Fig. 2 is an enlarged elevation of the support, illustrating the suspension rope in an elevated position, Fig. 3 is a vertical sectional view of the same, illustrating the suspension rope in its normal position, Fig. 4 is a cross sectional view of the base plate of my improved support, and Fig. 5 is a plan of the same.

My punching-bag support comprises a base plate 1, preferably circular in form and having a plurality of screw openings 2 whereby the base plate can be secured to the ceiling, wall, floor or rafters of a compartment of building, such as a gymnasium. The base plate is provided with a central enlargement 3 having a vertically disposed threaded opening 4 formed therein, to receive the threaded end 5 of a depending sleeve 6. The sleeve 6 is provided with a central bore 7 having curved edges 8 at one end thereof, while the opposite end of the bore terminates in a socket 9 formed in the threaded end 5 of the sleeve.

The suspension rope or cord 10 carrying a conventional form of punching-bag 11, is provided with an adjustable ball bearing 12, a screw 14 carried by said ball bearing engaging the suspension cable or rope, which passes through an opening 15 formed in said ball bearing. Easy access is had to the screw 14 when the bearing 12 is in its socket, through the medium of a slot 16 formed in the threaded end 5 of the sleeve 6.

It is a well known fact, especially among professional bag punchers, that the suspension ropes or cables thereby become stretched, causing the position of the punching-bag with relation to its rebounding device to vary. To overcome this, I have devised the adjustable ball bearing which can be easily and quickly adjusted upon the suspension cord or rope 10, to support the punching bag at a predetermined distance from its rebounding device, which in the present instance is a ceiling. The ball bearing 12 not only serves as an adjustable support for the suspension rope or cord 10, but serves functionally as a swivel, allowing the punching-bag to swing in any desired direction without twisting the suspension cord or cable.

My invention entirely resides in the novel construction of the sleeve 6 and the manner of holding the suspension cord or rope of the punching-bag therein, and for this reason I do not care to confine myself to the type of punching-bag used in connection with the support.

Such changes in the size, proportion and minor details of construction as are permissible by the appended claims may be resorted to without departing from the spirit and scope of the invention.

What I claim and desire to secure by Letters Patent, is:—

1. In a support for punching bags, the combination with a punching-bag and the suspension cord or rope thereof, of a base plate, a sleeve threaded in said plate, said sleeve having a bore formed therein terminating in a socket, said sleeve having a slot formed therein adjacent to said socket, and a ball bearing adjustably connected to said suspension cord or rope and seating in said socket.

2. In a support for punching-bags, the combination with a punching-bag and the suspension cord or rope thereof, of a sleeve, said sleeve having a bore formed therein terminating in a socket, a ball bearing adjustably connected to said suspension cord or rope, and seating in said socket, means to adjust said ball bearing, and means to support said plate.

3. A punching bag support consisting of a base plate having a depending central enlargement, a sleeve threaded into said enlargement having a socket in its upper end and provided in its side with a slot communicating with said socket, a ball mounted in said socket and provided with a central opening, a suspension cord for a punching bag passed through said central opening in the ball, and means accessible through the slot in said sleeve for adjustably securing said cord to said ball.

In testimony whereof I affix my signature in the presence of two witnesses.

ROBERT A. HART.

Witnesses:
   MAX H. SROLOVITZ,
   A. J. TRIGG.